United States Patent [19]

Kinoshita et al.

[11] Patent Number: 5,362,829
[45] Date of Patent: Nov. 8, 1994

[54] CEMENT DISPERSION AGENTS

[75] Inventors: Mitsuo Kinoshita; Yoshimasa Miura; Takeshi Arashima, all of Aichi, Japan

[73] Assignee: Takemoto Yushi Kabushiki Kaisha, Japan

[21] Appl. No.: 122,274

[22] Filed: Sep. 17, 1993

[30] Foreign Application Priority Data

Sep. 30, 1992 [JP] Japan .................. 4-286763
Aug. 30, 1993 [JP] Japan .................. 5-238741

[51] Int. Cl.$^5$ .................. C08F 230/04; C08F 228/02; C08K 3/00
[52] U.S. Cl. .................. 526/240; 526/287; 524/5
[58] Field of Search .................. 524/5; 526/240, 287

[56] References Cited

U.S. PATENT DOCUMENTS

| | | | |
|---|---|---|---|
| 4,808,641 | 2/1989 | Yagi et al. | 524/5 |
| 4,870,120 | 9/1989 | Tsubakimoto et al. | 524/5 |
| 4,962,173 | 10/1990 | Kinoshita et al. | 526/240 |
| 5,137,945 | 8/1992 | Tsubakimoto et al. | 524/5 |
| 5,162,402 | 11/1992 | Ogawa et al. | 524/5 |

FOREIGN PATENT DOCUMENTS

| | | | |
|---|---|---|---|
| 0074552 | 5/1983 | Japan | 524/5 |
| 0162157 | 9/1984 | Japan | 524/5 |
| 0051646 | 3/1985 | Japan | 524/5 |

*Primary Examiner*—Peter Szekely
*Attorney, Agent, or Firm*—Heller, Ehrman, White & McAuliffe

[57] ABSTRACT

Cement dispersion agents composed of water-soluble vinyl copolymers obtained by aqueous solution radical polymerization of five specified kinds of monomers at a ratio within a specified range can provide improved fluidity to high-strength hardened concrete and mortar with extremely low water-to-cement ratio.

2 Claims, No Drawings

CEMENT DISPERSION AGENTS

BACKGROUND OF THE INVENTION

This invention relates to cement dispersion agents. More particularly, this invention relates to cement dispersion agents capable of providing high fluidity to high-strength cement compounds with extremely low water-to-cement ratio and reducing the drop in the fluidity with the passage of time after mixing.

It has been known to use condensation products of naphthalene sulfonic acid and formaldehyde, condensation products of melamine sulfonic acid and formaldehyde or water-soluble vinyl copolymers as a cement dispersion agent. If such a prior art cement dispersion agent is used to produce a high-strength cement compound and, in particular, if it is desired to produce an ultra high-strength cement compound with extremely low water-to-cement ratio of less than 20% in order to obtain hardened concrete and mortar with compressive strength greater than 1100 kgf/cm$^2$, however, neither condensation products of naphthalene sulfonic acid and formaldehyde nor condensation products of melamine sulfonic acid and formaldehyde is capable of providing any fluidity to such a cement compound. If use is made of water-soluble vinyl copolymers (such as disclosed in U.S. Pat. No. 4,962,173 and Japanese Patent Application Tokkai 3-93660), it is not possible to provide sufficient fluidity to such cement compounds and the drop in whatever fluidity that has been provided with the passage of time after mixing (referred to as the slump loss) is large. It now goes without saying that workability becomes extremely poor if sufficient fluidity cannot be provided to a cement compound and the slump loss is large.

SUMMARY OF THE INVENTION

The problem to be solved by the present invention is that prior art cement dispersion agents, when used to produce high-strength cement compounds, cannot provide high fluidity to the produced high-strength cement compounds and that the slump loss is large.

The present inventors discovered, as a result of their diligent research in order to find solutions to this problem, that use as cement dispersion agent should be made of a water-soluble vinyl copolymer obtained by aqueous solution radical copolymerization of five specified kinds of monomers at specified ratios of copolymerization.

DETAILED DESCRIPTION OF THE INVENTION

This invention relates to cement dispersion agents comprising water-soluble vinyl copolymers obtained by aqueous solution radical copolymerization of a first monomer shown by Formula (1) given below, a second monomer shown by Formula (2) given below, a third monomer shown by Formula (3) given below, a fourth monomer shown by Formula (4) given below and a fifth monomer shown by Formula (5) given below such that the ratio of constituent monomer units is (First monomer)/(Second monomer)/(Third monomer)/(Fourth monomer)/(Fifth monomer)=45-65/8-23/3-25/5-25/0.1-15 (molar %) as converted to monomers, where:

Formula (1) is

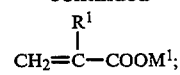

Formula (2) is

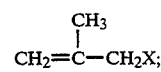

Formula (3) is

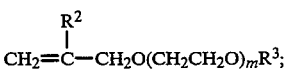

Formula (4) is

Formula (5) is

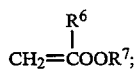

where $R^1$, $R^2$, $R^3$, $R^4$ and $R^6$ are each H or $CH_3$; $R^5$ and $R^7$ are each an alkyl group with 1–3 carbon atoms; X is $-SO_3M^2$ or an organic group shown by Formula (6) given below; $M^1$ is an alkali metal, an alkali earth metal, ammonium or organic amine; m is an integer 1–30; n is an integer 5–25; Formula (6) is

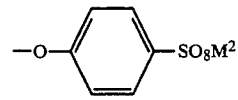

and $M^2$ is an alkali metal, an alkali earth metal, ammonium or organic amine.

Examples of the first monomer shown by Formula (1) include salts of alkali metals, salts of alkali earth metals and alkanol amine salts of (meth)acrylic acid. Examples of the second monomer shown by Formula (2) include (i) methallylsulfonates such as alkali metal salts, alkali earth metal salts and alkanol amine salts of methallylsulfonic acid; and (ii) p-methallyloxybenzene sulfonates such as alkali metal salt, alkali earth metal salts and alkanol amine salts of p-methallyloxybenzene sulfonic acid. Examples of the third monomer shown by Formula (3) include polyethyleneglycol mono(meth) allylether and methoxy polyethyleneglycol (meth) allylether each with molar number of additive ethylene oxide within the range of 1–30 and preferably 5–25. Examples of the fourth monomer shown by Formula (4) include alkoxy polyethyleneglycol (meth)acrylates such as (meth)acrylates of methoxy polyethyleneglycol, ethoxy polyethyleneglycol, propoxy polyethyleneglycol and isopropoxy polyethyleneglycol each with the molar number of additive ethylene oxide within the range of 5–25. Examples of the fifth monomer shown by Formula (5) include alkyl (meth)acrylates such as methyl(meth)acrylate, ethyl(meth)acrylate, propyl(meth)acrylate and isopropyl(meth) acrylate.

As explained above, the water-soluble vinyl copolymers of the present invention are obtained by aqueous solution radical copolymerization of first, second, third, fourth and fifth monomers respectively shown by Formulas (1), (2), (3), (4) and (5), but their copolymerization ratio (as converted to these monomers) is in the range of (First monomer)/(Second monomer)/(Third monomer)/(Fourth monomer)/(Fifth monomer)=-

45–65/8–23/3–25/5–25/0.1–15(molar %) and more preferably in the range of 50–62/10–20/5–20/7–20-/1–12 (molar %). If the ratio of any of these monomers falls out of the given range, the water-soluble vinyl copolymer which is obtained cannot exhibit the desired effects as a cement dispersion agent. Among the water-soluble vinyl copolymers thus obtained, those with average numerical molecular weight within the range of 2000–20000 (Pullulan converted by GPC method) are desirable from the point of view of fluidity provided to cement compounds when this is used as a cement dispersion agent and the effect on prevention of slump loss. Of the five kinds of monomers shown by Formulas (1)–(5), the second and third monomers shown by Formulas (2) and (3) are particularly important. If methallylsulfonate and p-methallyloxybenzene sulfonate are used simultaneously as a second monomer shown by Formula (2), in particular, the water-soluble vinyl monomer thereby obtained can provide even more improved fluidity to cement compositions mixed with microscopic powder admixtures such as silica fume, blast-furnace slag and fly ash as binder. The third monomer shown by Formula (3) serves to provide high fluidity even to ultra high-strength cement compounds with extremely low water-to-cement ratio of less than 25%.

The water-soluble vinyl copolymers of the present invention are obtained by aqueous solution radical copolymerization of the monomers described above at specified copolymerization ratios in the presence of a radical initiator. As for the method of copolymerization, it is important to use water or a mixture of water and a water-soluble organic solvent in an aqueous solution polymerization process. This may be done, for example, by first dissolving each monomer in water and preparing an aqueous solution containing each monomer with total content of 10–45%. Next, this aqueous solution is kept in a nitrogen gas, and a radical initiator is added for a radical copolymerization reaction at 50°–70° C. for 5–8 hours to obtain a water-soluble vinyl copolymer. There is no limitation as to the kind of radical initiator to be used for this purpose as long as it is dissociated at the temperature of copolymerization reaction to initiate radical polymerization, but it is preferable that the radical initiator be water-soluble. Examples of such water-soluble radical initiator include potassium persulfate, ammonium persulfate, hydrogen peroxide and 2,2′-azobis(2-amidinopropane) dihydrochloride. They can also be used as a redox initiator by combining with a reducing agent such as sulfites and L-ascorbic acid or an amine.

Cement dispersion agents of the present invention comprise water-soluble vinyl copolymers as explained above, but other agents can also be used together, depending on the purpose of the use. Examples of such other agents include air-entraining agents, antifoaming agents, coagulation accelerators and retarders, anti-rust agents, antiseptics and water-proofing agents. If they are to be used, they may be kneaded when the cement compound is prepared and added with water, or they may be added to the cement compound after it is kneaded.

Cement dispersion agents of this invention can be used when mortar and concrete are produced by using a binder composed of cement or a mixture of cement and a microscopic powder admixture. Examples of cement to be used include many kinds of portland cement such as ordinary portland cement, high early strength portland cement and moderate heat portland cement, fly ash cement, blast furnace cement, silica cement and many kinds of blended cement. Examples of microscopic powder admixture include silica fume, blast-furnace slag and fly ash. They are used usually at the rate of 0.1–2.0 weight % as converted to solid component with respect to the binder comprised of cement or a mixture of cement and a microscopic powder admixture. If too little is used, fluidity cannot be provided to the cement compound to a desirable degree, and the effect of preventing slump loss is adversely affected. The process of kneading itself may become difficult and hardened mortar and concrete of only poor quality may be obtained. If too much is used, on the other hand, setting retardation becomes too great, affecting the hardening process adversely. In some cases, segregation may result and it becomes difficult to obtain uniformly hardened mortar and concrete.

Cement dispersion agents of the present invention are capable, in particular, of providing high fluidity to cement compounds with extremely low water-to-cement ratio with content of binder 600–800kg/m$^3$ or more preferably 700–800kg/m$^3$, and water-to-binder (weight) ratio of greater than 15% and less than 25%, or more preferably greater than 15% and less than 20%, and high-strength hardened mortar and concrete can be obtained by using a cement dispersion agent of the present invention.

Next, examples will be presented in order to describe the invention more clearly but these examples are not intended to limit the scope of the invention. In what follows, "parts" will mean "weight parts" and "%" will mean "weight %" except where the amount of air is considered.

Examples

Part 1 (Synthesis of Water-Soluble Vinyl Copolymers As Cement Dispersion Agents)

Test Example 1

Methacrylic acid 54 parts (0.628 moles), sodium methallylsulfonate 18 parts (0.114 moles), sodium p-methallyloxybenzene sulfonate 10 parts (0.04 moles), polyethyleneglycol (with n=8, where n signifies throughout herein the molar number of added ethylene oxide) monoallylether 40 parts (0.098 moles), methoxypoly-ethyleneglycol (n=23) methacrylate 128 parts (0.120 moles), methyl acrylate 11 parts (0.128 moles) and ion exchange water 260 parts were placed inside a flask and dissolved with stirring. Next, a 30% aqueous solution of sodium hydroxide 84 parts was added to neutralize the methacrylic acid until the pH value of the reacting system was adjusted to 8.5. Next, the temperature of the reacting system was kept at 60° C. by means of a warm bath, and after the interior of the reacting system was replaced by nitrogen gas, a 20% aqueous solution of ammonium persulfate 30 parts was added as polymerization initiator to start polymerization. After four hours of reaction, a 20% aqueous solution of ammonium persulfate 15 parts was further added and the reaction was continued for three more hours to complete the polymerization. A 30% aqueous solution of sodium hydroxide was added for neutralizing acid decomposition products and a reaction product was obtained by completely neutralizing the reaction system. In order to remove monomers which have not reacted, the product was condensed by means of an evaporator, and after it was precipitated in petroleum ether and filtered, it was vacuum-dried to obtain refined water-soluble vinyl copolymer (A-1) 275 parts.

Water-soluble vinyl copolymer (A-1) was analyzed by UV absorption, NMR, atomic light absorption, elemental analysis, GPC and titration methods. It was learned that its carboxyl value was 128. Its sulfur content was 1.74% and its $Na_2O$ content was 8.8% by elemental analyses. The content of sodium p-methallyloxybenzene sulfonate was 3.5% by UV absorption. It was learned from the NMR analysis that its copolymerization ratio (as converted to each monomer) was (sodium methacrylate)/(sodium methallylsulfonate)/(sodium p-methallyloxybenzene sulfonate)/(polyethyleneglycol (n=8) monoallylether)/(methoxypolyethyleneglycol (n=23) methacrylate)/(methyl acrylate)=56/10/3.5/9/10.5/11 (molar ratio) and the average numerical molecular weight was 3600 (hereinafter Pullulan converted by GPC method).

Test Examples 2–5 and Comparison Examples 1–7

As in Test Example 1, water-soluble vinyl copolymers (A-2)–(A-5) listed in Table 1 and water-soluble vinyl copolymers (R-1)–(R-7) listed in Table 2 were obtained.

TABLE 1

| Kind | Mono-mer-a a-1 | Mono-mer-a a-2 | Mono-mer-b b-1 | Mono-mer-b b-2 | Mono-mer-c c-1 | Mono-mer-c c-2 | Mono-mer-d d-1 | Mono-mer-d d-2 | Monomer-e e-1 | Average Molecular Weight |
|---|---|---|---|---|---|---|---|---|---|---|
| A-1 | 56 | | 10 | 3.5 | 9 | | | 10.5 | 11 | 3600 |
| A-2 | 60 | | 8 | 5 | | 15 | | 10 | 2 | 5600 |
| A-3 | 55 | | 13 | | 12 | | | 12 | 8 | 2900 |
| A-4 | 51 | | 11 | | | 15 | | 20 | 3 | 8400 |
| A-5 | 61 | | 9 | 3 | | 10 | 11 | | 6 | 12000 |

TABLE 2

| Kind | Mono-mer-a a-1 | Mono-mer-a a-2 | Mono-mer-b b-1 | Mono-mer-b b-2 | Mono-mer-c c-1 | Mono-mer-c c-2 | Mono-mer-d d-1 | Mono-mer-d d-2 | Monomer-e e-1 | Average Molecular Weight |
|---|---|---|---|---|---|---|---|---|---|---|
| R-1 | 70 | | | | | | 30 | | | 8000 |
| R-2 | 60 | | 10 | | | | 20 | | 10 | 3500 |
| R-3 | 60 | | | | 20 | | 10 | | 10 | 10000 |
| R-4 | 50 | | 2 | | | 33 | 15 | | | 4500 |
| R-5 | 35 | | | 20 | 10 | | | 15 | 20 | 25000 |
| R-6 | | 63 | 8 | | | | 29 | | | 5800 |
| R-7 | 70 | | 12 | | | | 18 | | | 7500 |

In Tables 1 and 2:
Monomers-a, -b, -c, -d and -e: Monomers shown by Formulas (1), (2), (3), (4) and (5), respectively;
a-1: Sodium acrylate;
a-2: Sodium methacrylate;
b-1: Sodium methallylsulfonate;
b-2: Sodium p-methallyloxybenzene sulfonate;
c-1: Polyethyleneglycol (n = 8) monoallyl ether;
c-2: Polyethyleneglycol (n = 4) monoallyl ether;
d-1: Methoxypolyethyleneglycol (n = 23) methacrylate;
d-2: Methoxypolyethyleneglycol (n = 9) methacrylate;
e-1: Methyl acrylate.

Part 2 (Preparation and Evaluation of Concrete)
Preparation of Concrete

Ordinary portland cement, silica fume, fine aggregates and coarse aggregates were sequentially placed inside a pan-type mixer with capacity of 50 liters under the two different conditions (1) and (2) shown in Table 3 such that the target slump would be 25cm and the target amount of air would be less than 2%. Water-soluble vinyl copolymers synthesized in Part 1 and serving as cement dispersion agent and an antifoaming agent (polyoxyethylene (6 moles)/polyoxypropylene (40 moles) block olaylather) were kneaded together and added with water for a mixing process at 20° for 3 minutes to obtain concrete. The kinds and added amounts of these water-soluble vinyl copolymers used as cement dispersion agents are shown in Tables 4 and 5.

Method of Evaluation

For each concrete thus prepared, the slump, the amount of air and the compressive strength at 7 days and 28 days were measured according respectively to JIS(Japanese Industrial Standards)-A1101, JIS-A1128 and JIS-A1108. The slump was measured both immediately after the kneading and after 60 minutes. The results are shown in Tables 4 and 5.

TABLE 3

| Condition | Water-to-binder ratio (%) | Ratio of silica fume in binder (%) | Target slump (cm) | Sand-coarse aggregate ratio (%) | Used materials (kg/m³) Binder Cement | Silica fume | Water | Fine Aggregates | Coarse Aggregates |
|---|---|---|---|---|---|---|---|---|---|
| 1 | 20 | 0 | 25 | 35.3 | 750 | 0 | 150 | 560 | 1018 |
| 2 | 19 | 10 | 25 | 35.6 | 663 | 74 | 140 | 568 | 1018 |

In Table 3:
Binder: Cement + silica fume;
Cement: Ordinary portland cement (specific weight = 3.16);
Silica fume: Micro Silica 940U produced by Elkem, Inc. (specific weight = 2.20);
Fine aggregates: Sand from Oigawa River (specific weight = 2.63, finesse modulus = 2.71);
Coarse aggregates: Gravel from Danto (specific weight = 2.61, finesse module = 6.65).

TABLE 4

| Test No. | Condition | Cement dispersion agent Kind | Amount | Slump (cm) Immediately after | After 60 min. | Amount of air (%) | Compressive strength (kgf/cm²) at 7 days | at 28 days |
|---|---|---|---|---|---|---|---|---|
| 1 | (1) | A-1 | 1.0 | 25.8 | 24.2 | 1.1 | 970 | 1230 |
| 2 | (1) | A-2 | 1.3 | 25.4 | 24.1 | 1.3 | 940 | 1180 |
| 3 | (1) | A-3 | 1.4 | 25.6 | 23.4 | 1.2 | 930 | 1160 |
| 4 | (1) | A-4 | 1.5 | 25.3 | 23.6 | 1.3 | 950 | 1190 |
| 5 | (1) | A-5 | 1.4 | 25.7 | 23.8 | 1.0 | 960 | 1240 |
| 6 | (2) | A-1 | 0.8 | 25.4 | 24.2 | 1.0 | 970 | 1320 |

TABLE 4-continued

| Test No. | Condition | Cement dispersion agent Kind | Cement dispersion agent Amount | Slump (cm) Immediately after | Slump (cm) After 60 min. | Amount of air (%) | Compressive strength (kgf/cm²) at 7 days | Compressive strength (kgf/cm²) at 28 days |
|---|---|---|---|---|---|---|---|---|
| 7 | (2) | A-3 | 1.3 | 25.2 | 23.2 | 1.1 | 990 | 1330 |

TABLE 5

| Test No. | Condition | Cement dispersion agent Kind | Cement dispersion agent Amount | Slump (cm) Immediately after | Slump (cm) After 60 min. | Amount of air (%) | Compressive strength (kgf/cm²) at 7 days | Compressive strength (kgf/cm²) at 28 days |
|---|---|---|---|---|---|---|---|---|
| 8  | (1) | R-1 | 2.5 | *3   | —    | —   | —   | —    |
| 9  | (1) | R-2 | 2.5 | 25.8 | 16.2 | 1.7 | 840 | 1010 |
| 10 | (1) | R-3 | 2.5 | *3   | —    | —   | —   | —    |
| 11 | (1) | R-4 | 2.5 | *3   | —    | —   | —   | —    |
| 12 | (1) | R-5 | 2.5 | *3   | —    | —   | —   | —    |
| 13 | (1) | *2  | 2.2 | *3   | —    | —   | —   | —    |
| 14 | (2) | R-1 | 2.5 | *3   | —    | —   | —   | —    |
| 15 | (1) | R-6 | 2.0 | 25.3 | 13.5 | 1.8 | 850 | 990  |
| 16 | (1) | R-7 | 2.0 | 25.2 | 13.0 | 2.0 | 840 | 980  |
| 17 | (2) | R-6 | 1.5 | *3   | —    | —   | —   | —    |
| 18 | (2) | R-7 | 1.5 | *3   | —    | —   | —   | —    |

In Tables 4 and 5:
Amount of cement dispersion agent: Ratio of solid component (%) with respect to the binder;
Amount of antifoaming agent: Added by 0.005 weight % with respect to binder for all test examples except none was added to No. 6;
*2: Condensation product of naphthalene sulfonic acid and formaldehyde;
*3: Did not become a slurry and could not be kneaded for mixing.

In summary, cement dispersion agents of the present invention make it possible to provide high fluidity to high-strength cement compounds and, in particular, to ultra high-strength cement compounds, reducing their slump loss, and to obtain high-quality ultra high-strength hardened concrete and mortar with improved workability.

What is claimed is:

1. A cement dispersion agent comprising water-soluble vinyl copolymer obtained by aqueous solution radical copolymerization of a first monomer given by Formula (1), a second monomer given by Formula (Z), a third monomer given by Formula (3), a fourth monomer given by Formula (4) and a fifth monomer given by Formula (5) at copolymerization ratio of 45-65/8-23-/3-25/5-25/0.1-15 in molar % as converted to monomers;

Formulas (1), (2), (3), (4) and (5) being given respectively by $$CH_2=\overset{R^1}{\underset{|}{C}}-COOM^1,$$

$$CH_2=\overset{CH_3}{\underset{|}{C}}-CH_2X,$$

$$CH_2=\overset{R^2}{\underset{|}{C}}-CH_2O(CH_2CH_2O)_mR^3,$$

$$CH_2=\overset{R^4}{\underset{|}{C}}-COO(CH_2CH_2O)_nR^5,$$

and $$CH_2=\overset{R^6}{\underset{|}{C}}OOR^7,$$

where $R^1$, $R^2$, $R^3$, $R^4$ and $R^6$ are each H or $CH_3$; $R^5$ and $R^7$ are each an alkyl group with 1-3 carbon atoms; X is $-SO_3M^2$ or an organic group shown by

$M^1$ is an alkali metal, an alkali earth metal, ammonium or organic amine; m is an integer 1-30; n is an integer 5-25; and $M^2$ is an alkali metal, an alkali earth metal, ammonium or organic amine.

2. The cement dispersion agent of claim 1 wherein the average numerical molecular weight of said water-soluble vinyl copolymer is 2000-20000.

* * * * *